United States Patent [19]

Preusker

[11] 4,405,006
[45] Sep. 20, 1983

[54] ANTI-SKIDDING DEVICE FOR TIRED, PARTICULARLY PNEUMATIC-TIRED VEHICLE WHEELS ON ICE AND SNOW

[75] Inventor: Werner Preusker, Atzelgift, Fed. Rep. of Germany

[73] Assignee: Firma Niveau AG, Basel, Switzerland

[21] Appl. No.: 334,657

[22] Filed: Dec. 28, 1981

[30] Foreign Application Priority Data

Jan. 8, 1981 [DE] Fed. Rep. of Germany ....... 3100325
Nov. 14, 1981 [DE] Fed. Rep. of Germany ....... 3145250
Dec. 4, 1981 [DE] Fed. Rep. of Germany ....... 3148112

[51] Int. Cl.³ .............................................. B60C 27/00
[52] U.S. Cl. .................................... 152/170; 152/186; 152/216; 152/218; 152/221; 152/222; 152/229; 152/230; 301/37 PB; 301/37 S
[58] Field of Search ............. 152/208, 213 R, 213 A, 152/216, 225 R, 225 C, 226, 229, 230, 237, 273, 167, 170, 185, 174, 186, 181, 217, 218, 221, 222; 301/37 PB, 37 S, 37 R, 37 CM, 40 S, 108 R; 411/378, 411, 424; 403/348, 353

[56] References Cited

U.S. PATENT DOCUMENTS

| | | | |
|---|---|---|---|
| 2,443,261 | 6/1948 | Maxwell | 301/47 |
| 2,945,723 | 7/1960 | Estes | 301/37 PB |
| 3,926,240 | 12/1975 | Nickerson, Jr. | 152/226 |
| 4,171,718 | 10/1979 | Walrave | 152/226 X |
| 4,228,838 | 10/1980 | Zerlauth | 152/216 |

Primary Examiner—William A. Powell
Assistant Examiner—Thomas Bokan
Attorney, Agent, or Firm—Toren, McGeady and Stanger

[57] ABSTRACT

Anti-skidding device for vehicle wheels with tires, particularly pneumatic tires, for ice and snow surfaces. The anti-skidding device 100 consists of a support disk 120 which can be attached at the wheel disk or rim 11. The support disk is provided, adjacent to its periphery, with a plurality of anti-skidding arms 140 which extend radially in a fixed manner, equally spaced apart or are pivotal about axes 141 which extend parallel to the wheel disk bearing axis 117. The anti-skidding arms are prebent sections of plastic which engage over the tire travel surface 14 and carry spikes at their free ends.

32 Claims, 18 Drawing Figures

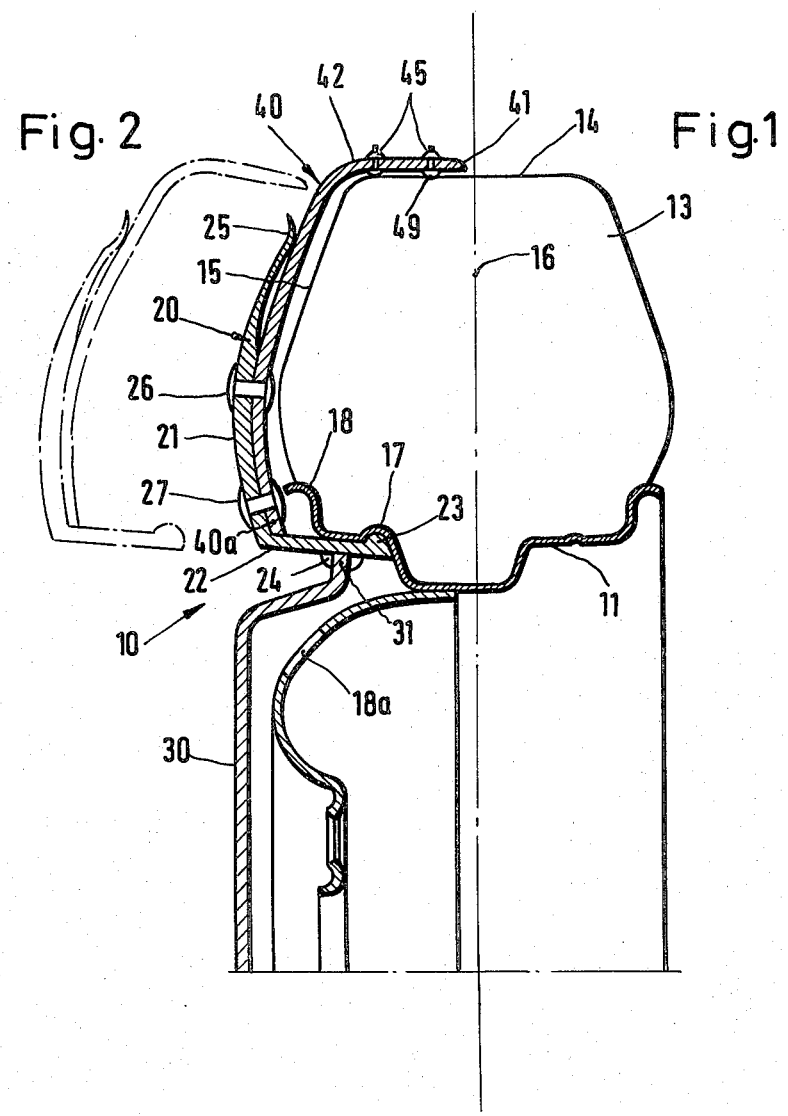

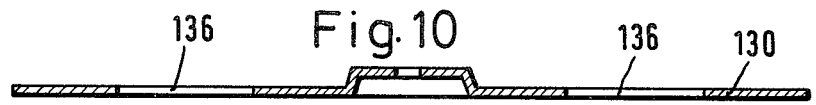
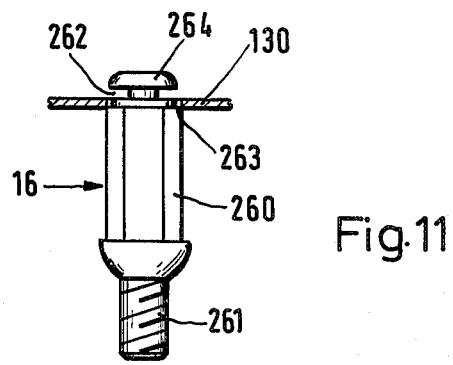
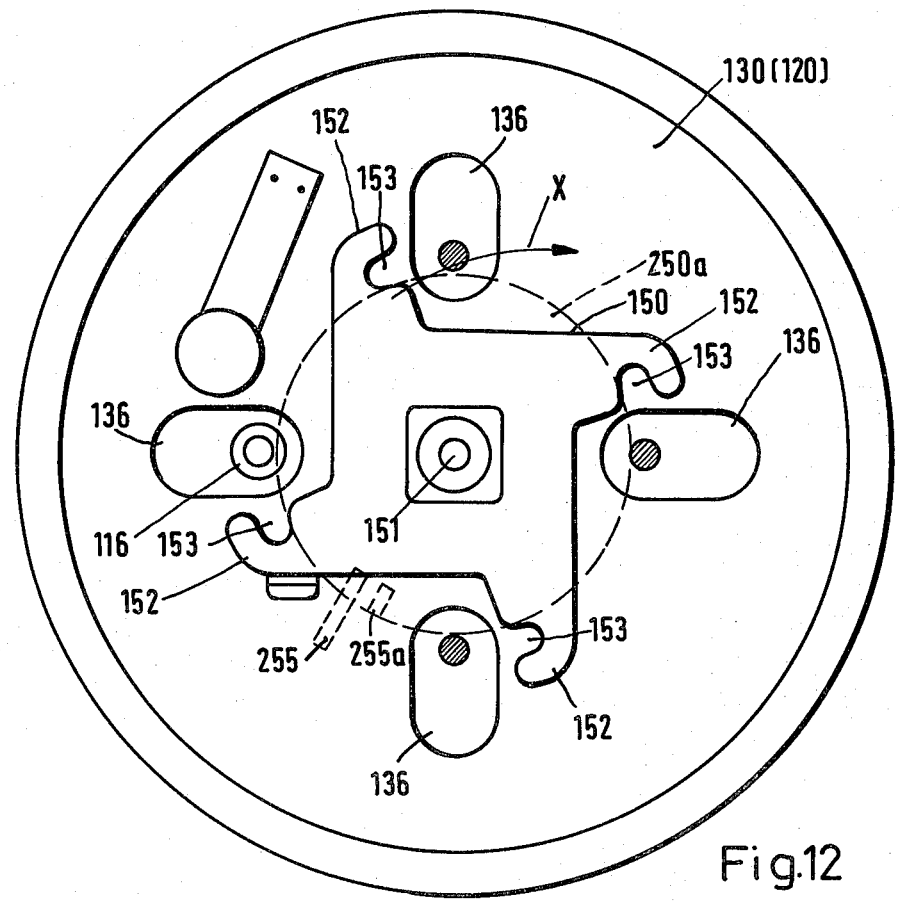

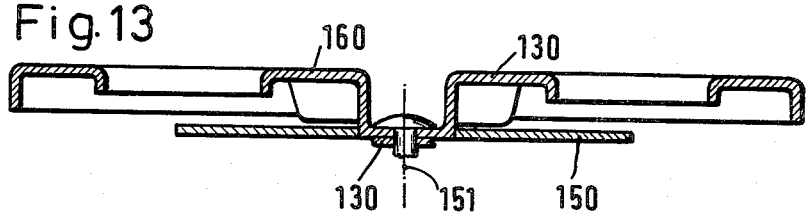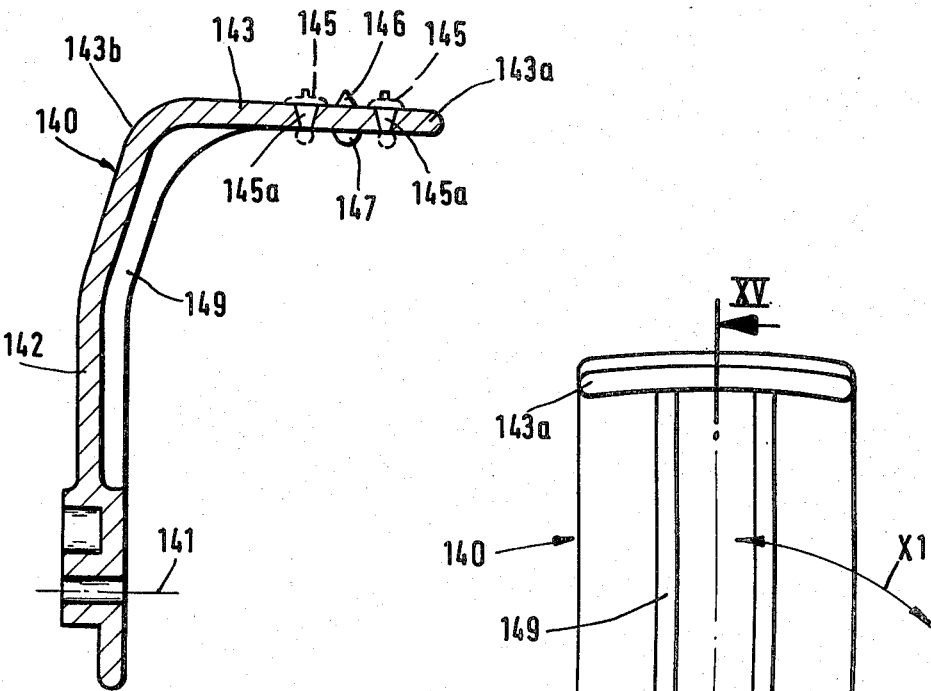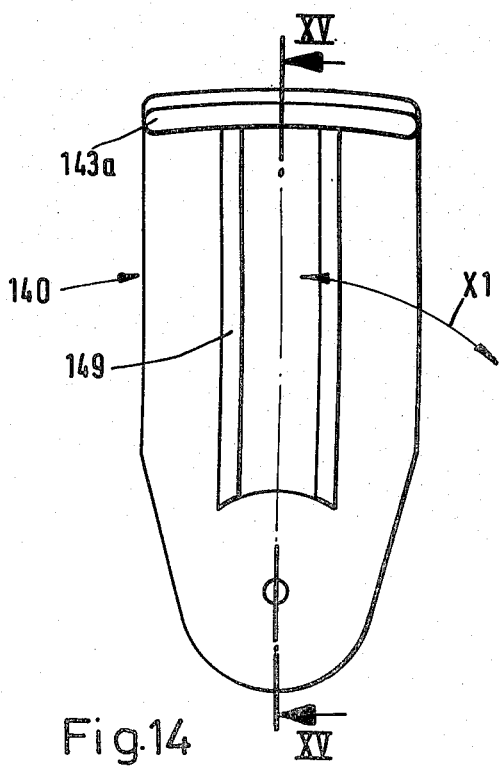

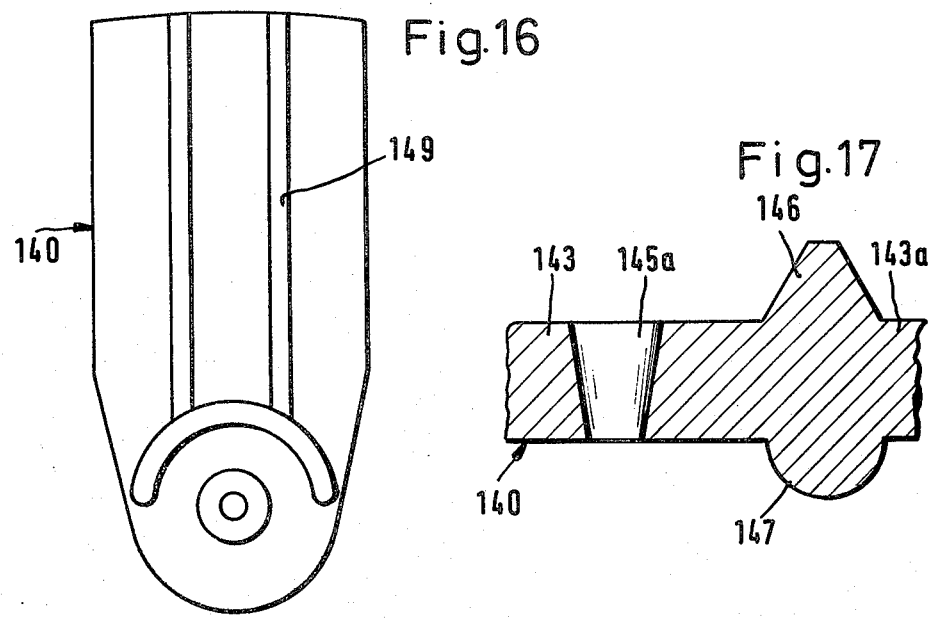
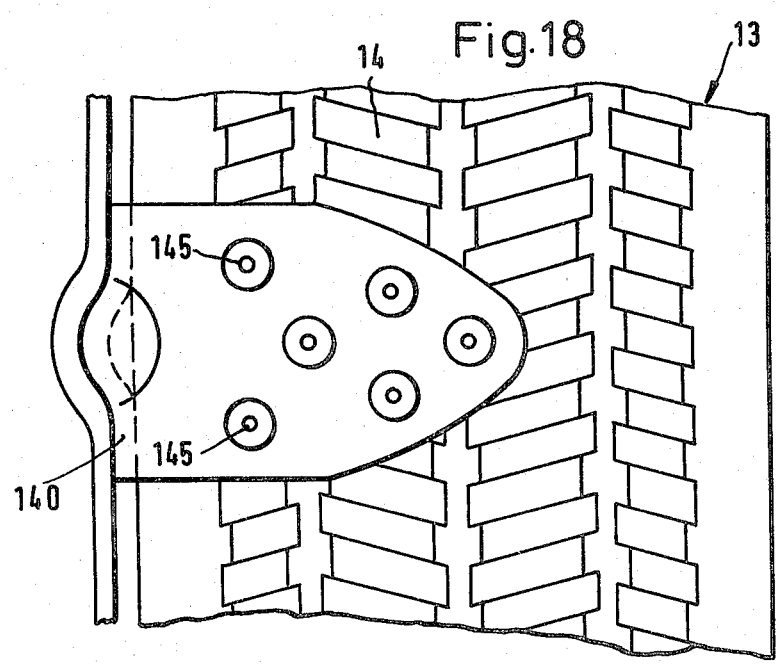

ANTI-SKIDDING DEVICE FOR TIRED, PARTICULARLY PNEUMATIC-TIRED VEHICLE WHEELS ON ICE AND SNOW

BACKGROUND OF THE INVENTION

The invention relates to an anti-skidding device for tired, particularly pneumatic-tired vehicle wheels when used on ice and snow.

In addition to snow chains, winter tires or so-called adhesive tires are used in winter when vehicles are driving on snow-covered inclines or gradients. Snow chains are not very popular because it is often difficult to apply them to the vehicle tires and because they must be driven in such a way that the road surface is not damaged, i.e. the snow chains have to be removed on the dry road surface portions following the snow or ice-covered portions. In addition, when travelling on dry road surfaces, snow chains are subject to considerable wear and do not permit travelling at high speeds. Snow chains and adhesive tires are often not available, particularly when roads are covered with ice and at short notice, e.g. when the icy surfaces are produced by drizzle or spray falling onto the frozen road surfaces. In addition, it is not always possible to use spiked tires.

Besides snow chains and adhesive tires, starting aids are known, but they are no substitute for snow chains and adhesive tires. These starting aids, which are constituted by clamp straps mounted on the tires, merely assist in moving the vehicle a short distance out of snow or slush.

DESCRIPTION OF THE PRIOR ART

For the purpose of increasing the grip of vehicle wheels, U.S. Pat. No. 2,443,261 discloses an anti-skidding device, which can be fitted to the wheel rims of motor vehicles and which comprises a basic disk and an annular disk rotatable about the centre thereof and on which are articulated pivoted levers for pivoting in and out triangular anti-skidding arms fixed in rotary manner to the basic disk. Thus, on rotating the annular disk, the anti-skidding arms are pivoted out from a position retracted relative to the tire circumference into a radial operating position, so that the pointed end portions project out of the plane formed by the tire tread and can be engaged in the substrate. In this known anti-skidding device, the anti-skidding arms are also located alongside the tire sidewall in the pivoted out position and in no way engage over the tire thread, so that the increase in the grip of the vehicle wheels does not take place through the direct action of the tire or its tread on the anti-skidding arms or of the anti-skidding arms on the ground surface. During operation, the anti-skidding arms do not form an integrated part of the tire in order to achieve an action corresponding to that of spikes embedded in the tread profile of a tire. In addition, this known anti-skidding device requires a large amount of space.

A further anti-skidding device for vehicle tires known from French Pat. No. 1,368,348 comprises a plurality of arm-like fastenings, which can be attached by means of a basic disk to the rim of a random vehicle wheel. The arm-like fastenings constantly engage over the tread surface in the operating position and when not in use cannot be pivoted out of the tread surface area. When not in use, the complete anti-skidding device must be removed from the rim.

A further anti-skidding device described in U.S. Pat. No. 2,610,898 comprises a plurality of spike-like ribs or teeth which, in the operating position, can be laterally extended alongside the tire, but do not engage over the tire tread. The radially arranged anti-skidding arms are pivoted in and out by using a rotatable disk, which can be fitted to a vehicle wheel rim. The anti-skidding arms used in this device are rigid and not resilient-elastic, because they must engage in the ice or snow-covered road surface during the rotation of the wheel.

DAS No. 2,750,111 discloses an anti-skidding device for tired, particularly pneumatic tired vehicle wheels, which comprises a supporting casing formed by a basic disk which can be fixed to the wheel disk and an annular disk rotatable with respect to the latter about the disk centre, and at least two equidistant anti-skidding arms, each of which being rotatably mounted on the basic disk and articulated in crank gear-like manner on one end of a pivoted lever, whose other end is rotatably connected with the outer periphery of the annular disk. On rotating the annular disk relative to the basic disk, the anti-skidding arms are pivoted out into a radial operating position from a position retracted with respect to the tire circumference. Between the basic disk and the annular disk, a gap is formed receiving the anti-skidding arms and pivoted levers in the starting position. The pivoted levers and anti-skidding arms are made from spring steel and dimensioned in such a way that the levers transfer the arms from their virtually flat or elongated shape in the starting position into a bent shape projecting into the tire tread in the operating positon. Although no problems are caused in the fitting of this anti-skidding device, it has a complicated construction.

SUMMARY OF THE INVENTION

The problem of the present invention is to obviate this problem. The invention solves the problem by providing an anti-skidding device for tired, particularly pneumatic tired vehicle wheels when travelling on snow and ice, which is used for anti-skidding purposes and for increasing the grip of vehicle wheels on snow and ice. Despite its effectiveness, it is economic to manufacture and permits higher travelling speeds than when using snow chains. Its efficiency is better than that of known anti-skidding devices, particularly during the braking process. The anti-skidding action is obtained by means of spikes, which are held on the tire tread and which, compared with snow chains, can be easily fitted and removed again at any time, whilst having a simple technical construction.

According to the invention, this problem is solved by an anti-skidding device for tired, particularly pneumatic tired vehicle wheels when used on ice and snow, characterized in that the device comprises an annular cover disk located in the outer surface area of the tire and having a plurality of equidistantly radially fixed anti-skidding arms made from spring steel or resilient-elastic plastic materials, whose free ends are slightly rough bent and wholly or zonally engage over the tire tread and carry on the outside a gripping profile or spikes, as well as a bracing disk for the cover disk mounted on the rim, whereby the anti-skidding arms are pretensioned in such a way that they engage on the tire tread in the operating position.

The essential advantages provided by the invention are that only a device constructed in this way provides an effective anti-skidding means for vehicle tires and ensures improved grip of the wheels on ice and snow. Due to the fact that the radially directed anti-skidding arms are made from spring strip steel or resilient-elastic plastic materials and project from the outside of the tire into its tread area, when the tire revolves the ends of the arms pass between the tread profile and the substrate, such as the road. The anti-skidding device has a relatively small number of components and therefore has a simple construction. Thus, its fitting and removal can be effortlessly carried out. In addition, the construction is completely maintenance-free.

The requisite tire engagement of the anti-skidding arms is brought about by pretensioning the cover disk and the arms. The mounting of the anti-skidding device on the rim is preferably in the form of a quick-action clamping means, so that the bracing disk is able to brace the cover disk and the anti-skidding arms. By rotating the bracing disk, the bracing action can be removed and consequently the anti-skidding device can be easily detached. The anti-skidding device can be fixed to the rim, e.g. on the flange or in the ventilation openings. Fitting and removal of the anti-skidding device can take place in a very short time and there is no risk of dirtying.

As a result of the pretensioning of the cover disk and the anti-skidding arms, when the anti-skidding device is fitted they engage over the vehicle tire on the tread side. The free end of each anti-skidding arm comes to rest in the vicinity of the tire tread and as a result of the pretension is pressed against the tread, whilst maintaining the approximately circular arc shape.

Due to the pretensioning of the cover disk and antiskidding arms and the fact that the latter are made from spring steel or resilient-elastic plastics, the possibility exists to adapt the arms to the tire cross-sectional profile in such a way that the free end of each arm comes to rest between the tire tread and the substrate when the vehicle is travelling or when the wheel is moving. Due to the construction of the anti-skidding arms in resilientelastic manner, in conjunction with the pretensioning, an elastic deformation and shaping of the arms is brought about when the device is in the operating state. Due to the fact that the anti-skidding arms come to rest between the tire tread and the substrate, very good adhesion between tire and substrate is ensured. Thus, this anti-skidding device is able to achieve the effect of spiked tires.

No problems are caused in fitting the anti-skidding device, because it is merely necessary to fit the cover disk and anti-skidding arms on the rim in such a way that the arms come to rest in the tire area, whilst the cover disk engages at one end in the rim hump and is held in the pretensioned position by means of the bracing disk mounted on the rim and connected thereto. The anti-skidding device can be manufacture inexpensively because it only consists of a small number of parts. When not in use, the anti-skidding device can be housed in a minimum area so that the possibility exists of mounting this device on a spare tire carried in a vehicle boot or trunk in such a way that the anti-skidding arms engage over the spare tire. Since, in addition, the anti-skidding device has a relatively flat construction, several such devices can be effortlessly held in superimposed manner on the spare tire. Due to their arrangement and construction, as well as the pretensioning action, in the operating state the anti-skidding arms automatically adapt to the tire movements. The anti-skidding device simultaneously protects both the vehicle and road due to quiet running. It can be constructed for most standard rims, without any modification to the rim being necessary.

The invention also provides a solution according to which an anti-skidding device for tired, particularly pneumatic tired vehicle wheels for use on ice and snow is proposed, which is constructed in such a way that the device comprises a support disk which can be fixed to the wheel disk or rim having a plurality of equidistant, radial anti-skidding arms pivotal about axes running parallel to the wheel disk bearing axis and which are made from a rough-bent profile of plastic or some other suitable material engaging over the tire tread and being provided externally on their free ends with a gripping profile or spikes.

The invention also provides a device for fixing the anti-skidding devices to a rim, characterized in that the support disk is fixed to the wheel disk or rim by means of rim screws, wheel studs or screw or bolt fastenings provided on the rim and has openings for the rim screws, and that a locking disk is held on the support disk and is provided with devices locking the rim screw to the support disk.

A device constructed in this way prevents vehicle tires from skidding and increases the grip of the wheels on ice and snow. Due to the fact that the anti-skidding arms are pivotally held on the support disk fixed to the rim, the fitting of the device is effortless in that in the contact area between tire and substrate, such as a road or the like, the anti-skidding arms can be swung out sideways and then on starting so engage with the tire tread that they assume a radial position relative to the other arms. The radial forces occurring when travelling are no longer transferred to the basic disk in the case of the present anti-skidding device and are instead absorbed by the pivotable anti-skidding arms. On braking, the anti-skidding arms are placed in front of the tire due to the mass moment of inertia which occurs and consequently increase the braking action. The anti-skidding arms thereby serve as friction-increasing members.

As the anti-skidding arms are made from plastic materials, have a certain resilient-elastic behaviour and are provided with a material reinforcement in the bent end area, when travelling the free ends of the anti-skidding arms only lift to a very limited extent from the tire tread. However, on passing through that area in which the tire frictionally engages with the road, the anti-skidding arms are pressed onto the tire tread, snow and ice which has been collected between the anti-skidding arms and the tread is forced out due to the interaction between the pressing and lifting effect. However, this lifting effect only occurs in the vicinity of the bent free ends of the arms and is extremely small. In addition, when travelling, the anti-skidding arms assume a radial and equidistant position. The pivotability of the arms is a valuable aid in fitting the anti-skidding device and also assists the braking action. When travelling, the arms always assume a vertical position and have a long life, due to the fact that they are made from plastic.

Fitting the anti-skidding device is effortless and merely involves placing on the rim screws fixed to the rim. For this purpose, the support disk carrying the anti-skidding arms is placed on the rim screws in such a way that their head-like ends project through the openings provided in the support disk. The locking disk rotatably arranged on the support disk is provided with gripping devices in such a way that on rotating the rotary disk, the support disk is locked with the rim screws. By opposite rotation of the locking disk, the locking to the rim screws is detachable, so that the anti-skidding device can be easily removed.

After the anti-skidding device has been fixed to the wheel rim, the anti-skidding arms engage over the vehicle tire on the tread side. The free end of each arm comes to rest in the vicinity of the tire tread. Due to the fact that the anti-skidding arms are preferably made from resilient-elastic plastics and have a rough-bent profile, the possibility exists of adapting the arms to the tire cross-sectional profile in such a way that the free end of each arm comes to rest between the tread and the substrate when the vehicle is travelling and when the wheel is revolving. Due to the fact that the arms come to rest between the tread and the substrate, very good adhesion of the tire to the substrate is achieved. In this way, it is possible for this anti-skidding device to achieve the same effect as that obtained with spiked tires.

The anti-skidding device can be manufactured in an inexpensive manner, because it only comprises a few parts. When not in use, the anti-skidding device can be housed in a very small area, which makes it possible for the anti-skidding device to be fitted on the spare tire carried in the vehicle trunk or boot in such a way that the anti-skidding arms engage over the spare wheel tire. Since, in addition, the anti-skidding device has a relatively flat construction, a plurality of anti-skidding devices can be held without difficulty in superimposed manner on the spare tire. Due to their arrangement and construction in the operating state the anti-skidding arms automatically adapt to the tire movements.

The anti-skidding device simultaneously protects the vehicle and road through quiet running. It can be constructed for most standard rims, without any modification to the latter being necessary, because the anti-skidding device is fixed by means of rim screws, which have a special construction for this purpose. In those cases when the rims are held by nuts on the wheel bolts, the construction of the nuts is adapted to the rim screws, so that here again effortless fixing of the anti-skidding device is possible.

Further embodiments of the invention are described in the subclaims, as well as hereinafter relative to non-limitative embodiments and the attached drawings, wherein show:

BRIEF DESCRIPTION OF THE DRAWING

FIG. 1 a part vertical section through a vehicle wheel with an anti-skidding arm engaging over the tire tread.

FIG. 2 an anti-skidding arm fixed to the cover disk of the anti-skidding device in the pretensioned position.

FIG. 10 a vertical section along line X—X in FIG. 8.

FIG. 11 a rim screw with fitted basic disk, partly in elevation and partly in vertical section.

FIG. 12 the basic disk with fitted rotary disk in a view from the front.

FIG. 13 the basic disk with the fitted locking disk according to FIG. 12 in a side view.

FIG. 14 an anti-skidding arm in a view of its inside.

FIG. 15 a vertical section along line XV—XV in FIG. 14.

FIG. 16 the anti-skidding arm in a view of its outside.

FIG. 17 the free end of an anti-skidding arm in a larger-scale, vertical section.

FIG. 18 an anti-skidding arm engaging on a tire tread in a view from above.

DESCRIPTION OF THE PREFERRED EMBODIMENT

Figure 3:
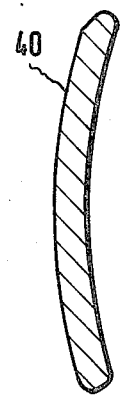
FIGS. 3 and 4 two different embodiments of an anti-skidding arm in horizontal sections.

As is shown in FIG. 1, the anti-skidding device 10 comprises an annular cover disk 20, a bracing disk 30 and a plurality of anti-skidding arms 40 radially fixed to the disk 20. The anti-skidding device is fixed to wheel 11, provided with a tire 13 and simultaneously constituting the rim. Wheel 11 is provided with a brake member, which is not shown in the drawing. The tread area of tire 13 is designated as 14 and the tire sidewall as 15.

The cover disk 20 comprises a portion 21 running parallel to the tire sidewall 15 and to which are fixed the anti-skidding arms 40, as well as a lower bent portion 22, whose free end has a bead-like supporting projection 23. On the side of portion 22 of cover disk 20 remote from projection 23, a holding device 24 is provided in which engages the bracing disk 30 with its all-round edge portion 31. This holding device 24 on cover disk 20 for bracing disk 30 is constructed in annular slot-like manner, so that disk 30 with its all-round edge portion 31 is guided and held in the annular slot-like engagement and holding profile (FIG. 1).

Portion 21 of cover disk 20 carrying anti-skidding arms 40, as well as the latter, have in the initial, pretensioned position shown in FIG. 2, compared with the vertical 16 located on the wheel axis, have a smaller angle relative to the portion 22 of cover disk 20 subject to the action of bracing disk 30 than in the operating position, so that in the starting position, disk 20 and arms 40 are as shown in FIG. 2. If cover disk 20 is mounted on rim 11 together with the bracing disk 30, then the disk portion 21 with anti-skidding arms 40 assumes the engagement position shown in FIG. 1 in which arm 40 engages on the outer sidewall 15 of tire 13 in such a way that the circular arc-shaped bent free end 41 of the arm wholly or partly engages over tire tread 14 of tire 13, this being dependent on the length of the bent portion 21.

Due to the fact that bracing disk 30 is fixed to rim 11 and with its edge portion 31 presses the cover disk portion 22 into rim hump 17 and thereby holds it in position, portion 21 with anti-skidding arm 40 is under certain pretension, which prevents arm 40 from being raised from the tread area 14 of tire 13. The pretensioning brings about a further engagement of anti-skidding arms 40 on outer sidewall 15 and in tread area 14 of tire 13.

In order to also achieve a high contact tension in the operating state, i.e. when travelling, portion 21 of cover disk 20 has the cross-sectional profile of FIG. 1. Thus, disk 20 has an outwardly tapering, all-round edge portion 25, which is bent and shaped in such a way that the free end of portion 25 rests on anti-skidding arm 40 and additionally transfers the latter into a form projecting into tread area 14 and maintains it in this form.

Each anti-skidding arm 40 fixed to cover disk 20 is made from spring strip steel or a resilient-elastic plastic material, which is resistant to very low temperatures and high abrasion. Each arm 40 is so constructed that its end is bent in circular arc shape in the manner shown in FIG. 1, so that the bent portion 41 comes to rest on tread 14 of tire 13. The fixing of each anti-skidding arm 40 to cover disk 20 takes place by means of bolt or rivet-like connecting means 26, 27, a detachable fixing of arms 40 to disk 20 also being possible in order to be able to replace worn arms 40.

In the same way as anti-skidding arms 40, cover disk 20 can be correspondingly made from spring strip steel or resilient-elastic plastic, so that due to the predetermined pretensioning on one side there is an adequate engagement of the anti-skidding arms 40 on the outer sidewall 15 and in tread area 14 of tire 13. It also has a certain elasticity, so that the anti-skidding arms 40 can adapt to the profile shape of the tire during movement.

Figure 4:
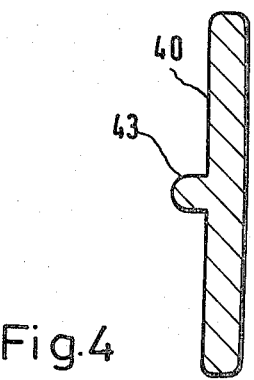

To increase tension, each anti-skidding arm 40 can have a special cross-sectional configuration. According to FIG. 3, the anti-skidding arm 40 has a circular arc-shaped cross-section, whereas in FIG. 4 it has an approximately rectangular cross-section with a reinforcing rib 43 running approximately centrally in the longitudinal direction of the arm.

End 40a of each anti-skidding arm 40 is fixed to cover disk 20 which, by means of bracing disk 30, is held in the sidewall area 15 of tire 13, so that arm 40 can assume the position shown in FIG. 1. There can be a random number of anti-skidding arms 40 on cover disk 20. However, there must be at least two such arms and all of them have the same angular spacing.

Bracing disk 30 is adapted to the rim profile and constructed in housing-like manner. The annular cover disk 20 is fixed and pretensioned by means of disk 30. To this end, bracing disk 30 with its all-round edge portion 31 is supported on cover disk portion 22 by means of the provided holding device 24. The means for holding cover disk 20 on rim 11 are preferably constituted by quick-action clamping means e.g. by means of pointed or shaped supporting projection segments 23, which engage in rim hump 17 and are braced with bracing disks 30 by means of spreading segments. Bracing disk 30 is rotatably fixed to rim 11 about the wheel axis, so that a rotation of disk 30 releases the bracing effect and the anti-skidding device can easily be removed. In its edge area, bracing disk 30 has spaced segment-like portions engaging in the annular slot-like profile of holding device 24 on disk 20 in the bracing position, said holding device 24 being portion-wise arranged and constructed, so that through a rotation of disk 30 the segment-like portions on its edge can be moved out of holding device 24, so that the anti-skidding device can be removed. However, it is also possible to fix bracing disk 30 to cover disk 20, so that then the anti-skidding device 20 can be fixed as a structural unit to rim 11. The bracing disk 30 can also be fixed to the wheel flange 18 or into the ventilation openings 18a of the rim.

Each anti-skidding arm 40 has on the outside of its free end 41 a gripping profile or is provided at the end with at least one spike 45. In the embodiment of FIG. 1, anti-skidding arm 40 has at its end 41 two spikes 45. The gripping profile formed in the outside 42 of end 41 of arm 40 can be constructed as a groove or land profile, but other profile types can also be used. It is important that the adhesion area between tire tread 14 and the substrate is increased by means of said anti-skidding arm 40.

Figure 5:
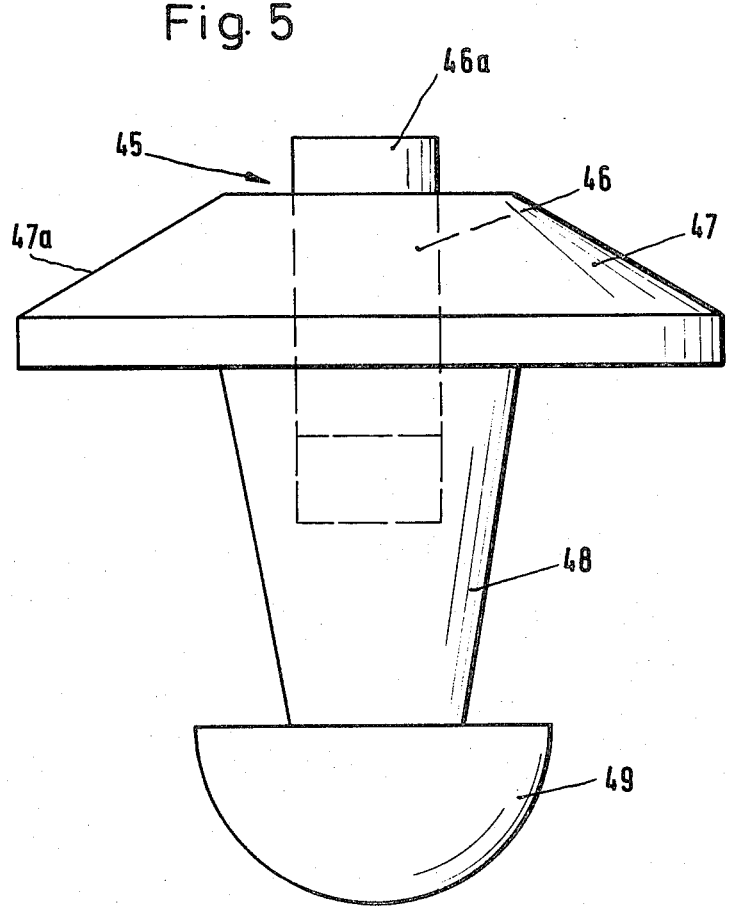
FIG. 5 a side view of a spike.

Spike 45 arranged on anti-skidding arm 40 can be constructed in per se known manner. However, the embodiment of a spike 45 shown in FIG. 5 is particularly advantageous, because it simultaneously constitutes an adhesion aid on the tire side. Spike 45 comprises a disk-like core member 47 having an all-round edge portion 47a, which conically tapers upwards towards the centre. This core member 47 centrally has a bolt-like hard metal core 46, whereof a portion 46a projects from member 47. On the side remote from portion 46a of hard metal core 46, core member 47 has a holding member 48, whose length approximately corresponds to the thickness of the anti-skidding arm 40. This holding web 48 carries at its free end a tire-side adhesion member 49, which can for example be constructed in spherical cap-like manner. If arm 40 engages with its bent end portion 41 of tread 14 of tire 13, the adhesion members 49 of spike 45 engage on the anti-skidding arm ends in the groove profile of the tire tread, so that increased adhesion of the arm ends on the tread is ensured. In this way, the position of arms 40 on the tread is ensured by means of the profile.

The invention is not restricted to the embodiments described hereinbefore and shown in the drawing. Variations from the construction of cover disk 20 fall within the scope of the invention, as does a different construction of bracing disk 30, which is to be adapted to the particular rim construction. Engagement portion 22 of cover disk 20 can also have a different construction, if required by the rim construction. For the easier handling of bracing disk 30, it can be provided with a grip-like handle, which is not shown in the drawing.

After fitting cover disk 20 by bracing with bracing disk 30, disk portion 21 is moved outwards from its initial position and, like the anti-skidding arms 40, automatically attempts to reset itself due to the selection of materials made, so that arms 40 engage on the tire tread.

Figure 6:
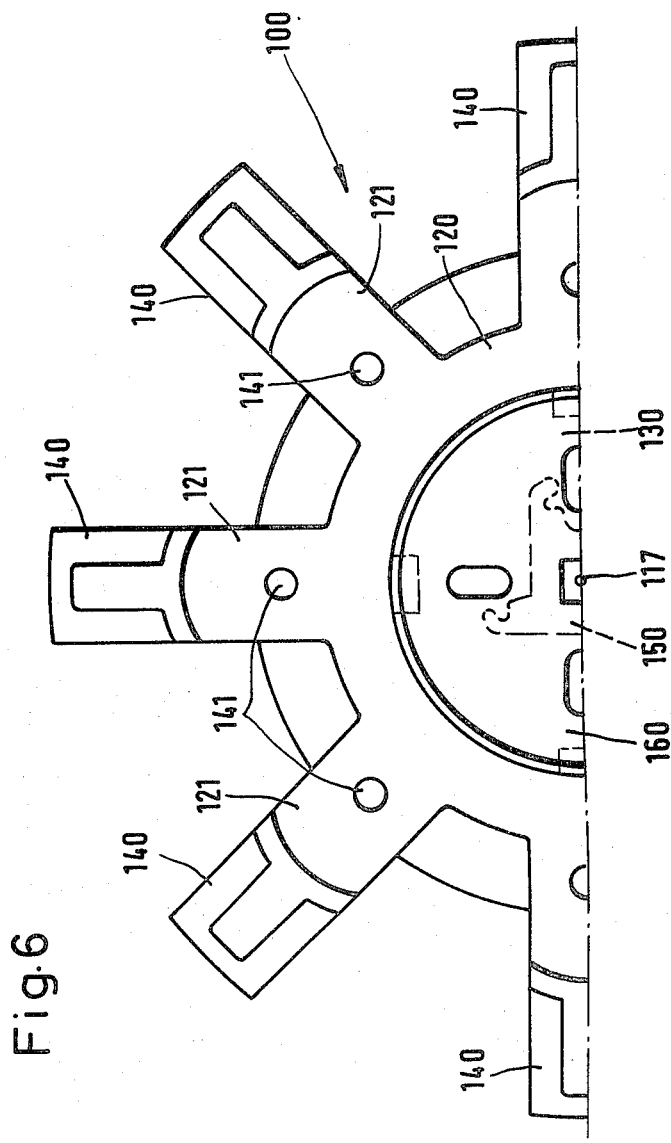
FIG. 6 a partial view of the anti-skidding device.
Figure 7:
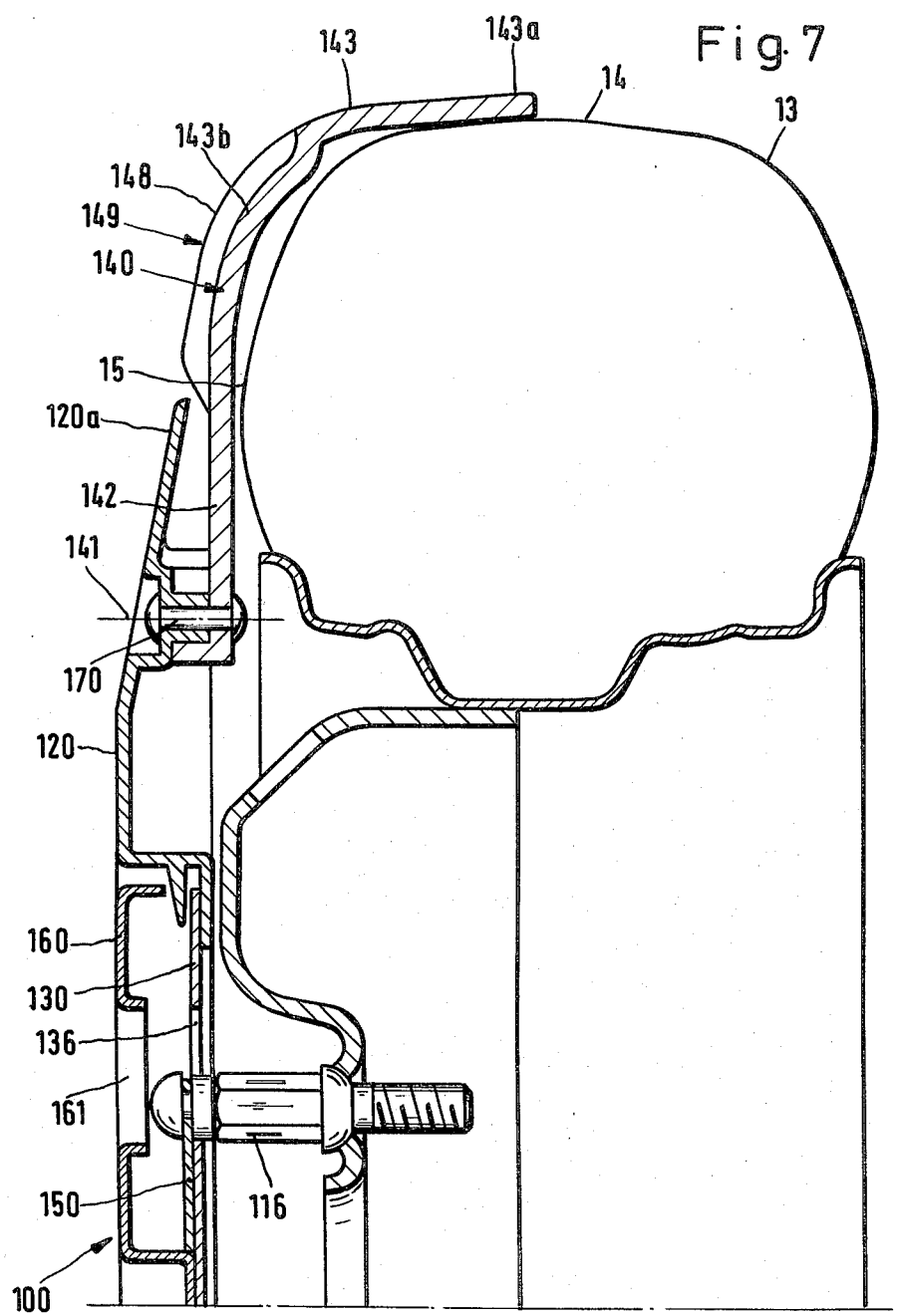
FIG. 7 an anti-skidding arm pivotably fixed to a support disk fixed to a rim screw, partly in elevation and partly in vertical section.

As shown in FIGS. 6 and 7, the anti-skidding device 100 comprises a support disk 120 and a plurality of anti-skidding arms 140 fixed to disk 120. The anti-skidding device is fixed to wheel 11, which simultaneously constitutes the rim, provided with a tire 13. Wheel 11 is provided with a brake part not shown in the drawing. The tread area of tire 13 is designated as 14 and the outer sidewall of the tire as 115.

The fixing of support disk 120 to the wheel or rim 11 is brought about by means of rim screws 116 (FIGS. 7 and 11) or the wheel bolt. However, screw or bolt-like fastenings can be provided on the actual rim for fixing disk 120 to said rim.

In the embodiment of FIG. 7, support disk 120 is constructed as an annular disk and has in its central area a basic disk 130, which can be held both in a rotary manner in disk 120 and fixed to the latter, to which further reference will be made hereinafter. A locking disk 150 is rotatably held on basic disk 130.

Basic disk 130 has a plurality of openings 136 for the passage of rim screws 116. The number of said openings 136 in basic disk 130 corresponds to the number of rim screws 116 used. In the embodiment of the drawing, basic disk 130 has four openings 136. If basic disk 130 is integrated into support disk 120, i.e. if the latter is constructed as a full-area disk then the latter has the number of openings 136 corresponding to the number of rim screws 116.

If the support disk 120 is constructed as a full-area disk and is provided with openings 136 for rim screws 116 or in the case of an annular disk-like construction of disk 120, basic disk 130 with openings 136 for rim screws 116 is fixed thereto, then anti-skidding arms 140 are pivot about pivot pins 141 running parallel to the wheel disk bearing axis 117 on the outer circumference of support disk 120 or adjacent thereto, as shown in FIG. 7.

Each anti-skidding arm 140 comprises a profile member bent at one end. Arm portion 142 running parallel to the sidewall 115 of tire 13 is followed by the end-side bent portion 143, which engages over tire tread 14 when the anti-skidding device is fitted (FIGS. 7 and 18).

Each anti-skidding arm 140 is made from plastic or other suitable materials, plastics being advantageous which have a resilient-elastic behavior, but which still have an inherent stability. Each anti-skidding arm 140 has at its free end 143 on the side facing tire tread 14 a protuberance 147 and on the outside at least one spike 146 made from the same plastic material as the anti-skidding arm, note FIG. 15. Protuberance 147 on the side of arm 140 facing tread 14 increases the friction between arm 140 and the profile of tread 14, so that good adhesion of the arm on the tread is ensured. Instead of spike 146 made from the anti-skidding arm material and shaped at the same time as arm 140 is produced, the free end 143a of arm 140 can be provided with at least one opening 145a for the insertion of a spike made from a metallic material. As each anti-skidding arm 140 comprises a wide profile member, it is possible to provide a plurality of spikes on the free arm end 143a (FIGS. 14 to 18).

In addition, each anti-skidding arm 140 is provided with a material accumulation 148 in bent area 143b. As a result of material accumulation 148, the weight of the anti-skidding arm, particularly in bent area 143b is increased, so that the weight increase prevents a lateral raising of arm portion 142 of arm 140 from the tire sidewall 115. Furthermore, each anti-skidding arm 140 can be provided with a reinforcing rib 149, which simultaneousely forms the material accumulation 148 (FIGS. 14 to 16).

Figure 9:
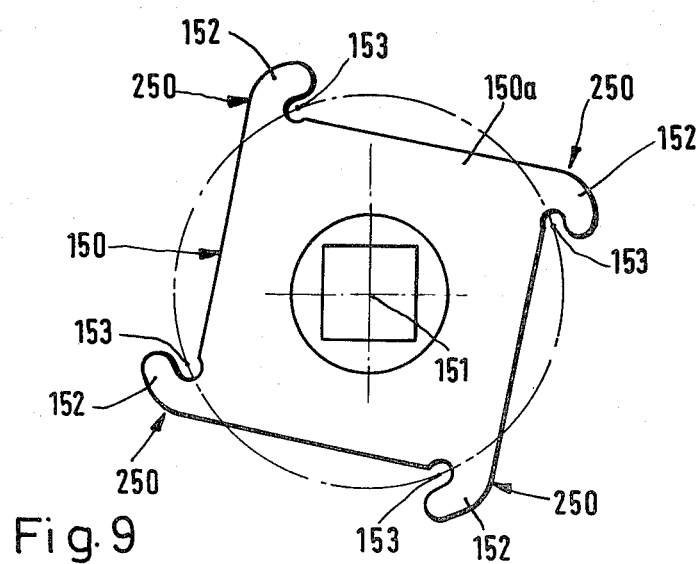
FIG. 9 a locking disk rotatably held on the basic disk with devices for locking the anti-skidding device to the rim screws in plan view.

Locking disk 150 arranged on basic disk 130 or support disk 120 so as to be rotatable about axis 151 has a locking device 250 used for fixing and locking the anti-skidding device to the wheel or rim 11, note FIGS. 9 and 12. This locking disk 150 comprises an approximately square plate member 150a provided in its four corners with four lateral arms 152, whereof each arm 152 is provided with a semicircular engagement recess 153 (FIG. 9). By means of the engagement recesses 153 on arms 152 of locking disk 150, basic disk 130 placed on wheel 11 is locked in such a way that on rotating disk 150 in the direction of arrow X, recesses 153 engage in the portions of rim screws 116 passing through openings 136.

Rim screws 116 are constructed in the manner shown in FIGS. 7 and 11. Each rim screw 116 comprises a bolt-like body 260 with an external thread 261 formed at one end. The other head-like end 264 of rim screw 116 has a retracted portion 262 or is provided with an annular slot. The transition from the annular slot to the bolt-like body 260 is formed by a shoulder-like portion 263, which can be constructed in such a way that it simultaneousely forms a contact surface for basic disk 130 without impairing the engagement of locking device 250.

Figure 8:
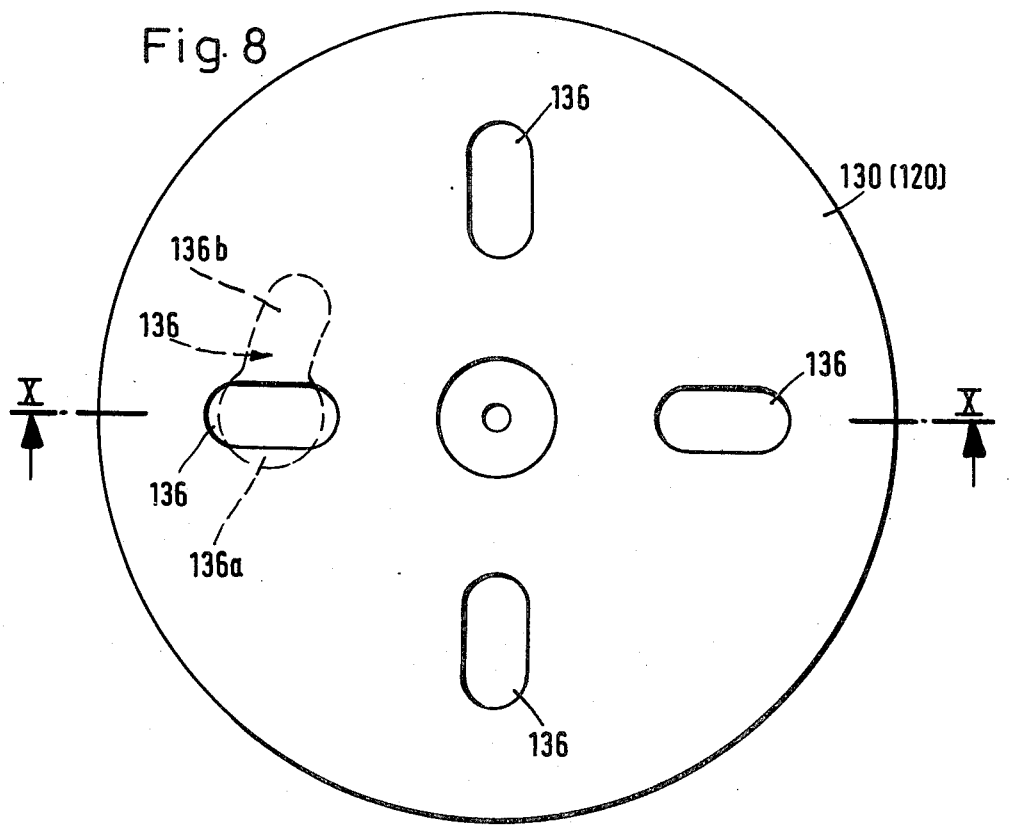
FIG. 8 a basic disk held on the support disk with engagement openings for the rim screws in plan view.

Openings 136 in basic disk 130 have a diameter corresponding at least to the diameter of rim screws 116. As shown in FIGS. 8 and 12, openings 136 are constructed as elongated holes and are arranged in basic disk 130 in such a way that the openings 136 with their longitudinal axis come to rest in a radial manner. However, it is also possible to give the openings 136 in basic disk 130 a different configuration. Thus, each opening 136 can have a circular portion 136a, whose diameter is larger than that of rim screw 116, note FIG. 8. This circular portion 136a is followed by an elongated hole-like portion 136b, whose diameter corresponds to that of the annular slot 262 of rim screw 116. Openings 136 are arranged in basic disk 130 in such a way that portions 136b are located on a circular arc-like line. The anti-skidding device 100 is locked to the rim screws 116 solely through the rotation of basic disk 130, so that portions 136b come to rest in the vicinity of annular slots 262 of the rim screws 116, so that the locking action is obtained. However, such a construction is only possible if basic disk 130 is rotatably mounted in support disk 20. In this embodiment, there is no need for a separately constructed locking disk 150 provided with locking devices 250. In this case, basic disk 130 is provided with a handle, not shown in the drawing, in order to be able to rotate disk 130 for locking purposes.

However, if openings 136 in basic disk 130 are in the form shown in FIGS. 8 and 12, it is necessary to use a locking disk 150 with locking device 250. Locking disk 150 is provided with a handle not shown in the drawing, so that said disk can be rotated about its rotation axis 151 for locking purposes.

The number of arms 152 carrying the semicircular engagement recesses 153 and provided on locking disk 150 corresponds to the number of rim screws 116 used.

The engagement recesses 153 are arranged on arms 152 of locking disk 150 in such a way that on rotating disk 150 in the direction of arrow X, recesses 153 are at the front and consequently engage with the annular slots 262 of rim screws 116. Support disk 120 or basic disk 130 is so arranged relative to rim screws 116 when the anti-skidding device 100 is fitted, that it comes to rest roughly in the plane formed by the shoulder-like portions 263 of rim screws 116, so that the arms 152 of the plate-like locking disk 150 arranged on support disk 120 or basic disk 130 comes to rest in the plane formed by the annular slots 262 of screws 116. Thus, on rotating locking disk 150, its engagement recesses 153 engage in the annular slots 262 of rim screws 116. The radial arrangement of openings 136 in basic disk 130 also provides the advantage that it is possible to align the anti-skidding device 100 with the rim screws 116 during the fixing process. In the locked state, the areas of arms 152 adjacent to engagement recesses 153 overlap the areas of openings 136 remaining around the rim screws 116 placed through the openings, so that a firm seat of anti-skidding device 100 on wheel 11 is achieved.

The previously described locking device shown in the drawing can also be replaced by differently constructed locking devices. It is essential to bring about locking with the aid of rim screws 116 as a result of the construction thereof.

The locking disk 150 arranged on support disk 120 or basic disk 130 is covered by a cover disk 160 held either on disk 120 or disk 130 in such a way that the rotation of disk 150 is in no way impaired (FIG. 7). Cover disk 160 is provided with an opening 161 through which can pass a handle, not shown in the drawing and fixed to rotary disk 150. In addition, cover disk 160 has a number of inspection window-like openings corresponding to the number of rim fixing screws. Cover disk 160 can be held in rotary manner on disk 120 or disk 130 with gripping profiles for manual actuation and can be connected to locking disk 150.

If support disk 120 is fixed to basic disk 130 or if support disk 120 simultaneously constitutes basic disk 130, then the anti-skidding arms 140 are pivotably mounted on the circumference of support disk 120 by means of pivot means. This pivotability of the anti-skidding arms is achieved by riveted or screwed connections 170, which are such that the pivotability of arms 140 in the direction of arrow X1 is not impaired (FIGS. 7 and 14). Support disk 120 is then provided with an all-round extended portion 120a engaging over the articulation area for anti-skidding arms 140.

However, according to a further embodiment of the invention, it is also possible to hold support disk 120 on basic disk 130 in rotary manner. In this embodiment, basic disk 130 is locked with rim screws 116 by means of locking disk 150. By means of correspondingly constructed guides, disk 120 can be rotated about disk 130. In this embodiment, anti-skidding arms 140 are fixed on support disk 120, so that through the possibility of rotating support disk 120 a small position change of arms 140 engaged on tire 113 is possible.

In those cases when the wheel or rim 11 is held by means of wheel bolts on the brake drum, the ends of rim screws 116 remote from screw head 264 are provided with an internal thread, so that fixing members constructed in this way can be screwed onto the wheel bolt for fitting the anti-skidding device 100.

The number of anti-skidding arms 140 fixed to support disk 120 is a function of the size of the tire 13 to be provided with the anti-skidding device. To prevent any lateral displacement of anti-skidding arms 140, support disk 120 can have arm-like extensions 121, which can be pivotally held on arms 140 and which externally engage over the latter (FIG. 6).

Locking disk 150 is connected to an arresting device 255 in such a way that when locking to the rim screws has taken place, locking disk 150 cannot become automatically detached from its locking position, this only being possible after releasing the arresting device, which can be constructed as a push-button catch (FIG. 12). Advantageously, locking disk 150 is then constructed as a circular device 250a, in whose circumferential area is arranged the arresting device 255, locking disk 250a being provided with a stop 255a which cooperates with the arresting device.

I claim:

1. Anti-skidding device for tires, particularly for pneumatic tire vehicle wheels when used in ice and snow, arranged to be mounted on a motor vehicle wheel, including a base disk arranged to be positioned opposite the motor vehicle wheel, anti-skidding arms arranged to extend radially outwardly of said base disk, in the operating position said anti-skidding arms having radially inner first ends and radially outer second ends and said second ends arranged to be positioned between the tire tread and the surface over which the tire travels, and means for securing said base disk on the motor vehicle wheel, wherein the improvement comprises an annular cover disk arranged to be positioned opposite the side wall of a tire mounted on the motor vehicle wheel, said base disk spaced radially inwardly of said cover disk and arranged to attach said cover disk to the rim of the motor vehicle wheel, said first ends of said anti-skidding arms attached to said cover disk and said second ends of said anti-skidding arms spaced radially outwardly from said cover disk, said anti-skidding arms bent angularly at the second ends thereof relative to said cover disk and arranged in the operating position to remain in position between the tire tread and the surface on which the tire travels.

2. Anti-skidding device for tires, as set forth in claim 1, wherein said anti-skidding arms are spaced equiangularly apart and are formed from a springy resilient material, and said cover disk and said anti-skidding arms are prestressed so that in the operating position they are biased inwardly against the tire with the second ends of said anti-skidding arms biased into the juxtaposition with the tire tread.

3. Anti-skidding device for tires, as set forth in claim 2, wherein said anti-skidding arms are formed of spring steel.

4. Anti-skidding device for tires, as set forth in claim 2, wherein said anti-skidding arms are formed of a resilient-elastic plastic material.

5. Anti-skidding devices for tires, as set forth in claim 3 or 4, wherein means are formed on the surface of the second ends of said anti-skidding arms for affording a gripping action when the anti-skidding device is used on ice or snow.

6. Anti-skidding device for tires, as set forth in claim 5, wherein said means comprises a gripping profiled surface formed on the surface of the second ends of said anti-skidding arms arranged to face outwardly from the tire.

7. Anti-skidding device for tires, as set forth in claim 5, wherein said means comprises spikes projecting through said second ends of said anti-skidding arms with the pointed ends of said spikes facing outwardly from the surface of the second ends of said anti-skidding arms arranged to face outwardly from the tire.

8. Anti-skidding device for tires, as set forth in claim 1, wherein said anti-skidding arms are equiangularly spaced apart and each said anti-skidding arm is pivotally secured at the first end to said cover disk, said anti-skidding arms in the operating position extend radially outwardly from said cover disk with the radially outer ends thereof bent in the direction away from said cover disk, said anti-skidding arms are formed of a springy resilient plastic-like material, and means formed on the second ends of said skidding arms for affording a gripping action when the anti-skidding device is used on ice or snow.

9. Anti-skidding device for tires, as set forth in claim 8, wherein rim screws are arranged for securing said cover disk to the motor vehicle wheel, said cover disk having elongated slot-like openings therein arranged to fit over said rim screws, and a locking disk secured on said cover disk and including means for locking said cover disk to said rim screws.

10. Anti-skidding device for tires, as set forth in claim 1, wherein said cover disk has a portion to which said anti-skidding arms are attached with said portion arranged to run parallel to the tire sidewall and a lower bent portion arranged to extend inwardly from said portion mounting said anti-skidding arms toward the rim of the motor vehicle wheel, and the end of said lower bent portion spaced from the other said portion having a bead-like supporting projection thereon arranged to extend into a rim hump, and a holding device on the opposite side of said lower bent portion from said projection arranged to engage said base disk around the circumferential edge thereof.

11. Anti-skidding device for tires, as set forth in claim 10, including a plurality of segment-like portions located on the outer circumferential edge of said base disk with said segment-like portions arranged to engage in said holding device on said cover disk.

12. Anti-skidding device for tires, as set forth in claim 11, wherein said holding device on said cover disk is an annular slot-like member.

13. Anti-skidding device for tires, as set forth in claim 12, wherein said cover disk is arranged to rotate about the motor vehicle wheel axle.

14. Anti-skidding device for tires, as set forth in claim 13, wherein said cover disk having a starting position before it is fitted onto the motor vehicle wheel and an operating position after it is fitted onto the motor vehicle wheel, and said portion of said cover disk mounting said anti-skidding arms having a smaller angle relative to said lower bent portion in the starting position as compared to the operating position.

15. Anti-skidding device for tires, as set forth in claim 14, wherein the edge of said portion of said cover disk mounting said anti-skidding arms spaced from said lower bent portion is bent so that it extends outwardly from the sidewall of the tire in the operating position and said outwardly bent portion bears against said anti-skidding arms biasing said arms so that the second ends thereof are positioned over the tire tread.

16. Anti-skidding device for tires, as set forth in claim 15, wherein said anti-skidding arms are detachably connected to said cover disk.

17. Anti-skidding device for tires, as set forth in claim 16, including detachable rivet-like connecting means for detachably connecting said anti-skidding arms to said cover disk.

18. Anti-skidding device for tires, as set forth in claim 17, wherein each said anti-skidding arm has a circular arc-like cross section for increasing the tensioning action thereof.

19. Anti-skidding device for tires, as set forth in claim 18, wherein each of said anti-skidding arm has an approximately rectangular cross section with a reinforcing rib formed in one surface of said arm and extending in the long direction thereof.

20. Anti-skidding device for tires, as set forth in claim 19, including at least one spike fixed to each said anti-skidding arm adjacent the second end thereof, each said spike comprising a disk-like core member extending generally transversely of the direction of said spike and having an encircling edge portion, said encircling edge portion tapering conically inwardly toward the apex end of said spike, a hard metal core centrally positioned within and projecting outwardly from said core member and forming the apex of said spike, a holding web secured to said core member and extending in the opposite direction from which said hard metal core projects from said core member, said holding web having an axially length corresponding to the wall thickness of said anti-skidding arm adjacent the second end thereof, and a tire-side adhesion member formed on the end of said holding web spaced from said core member.

21. Anti-skidding device for tires, as set forth in claim 9, wherein each rim screw contains an annular slot encircling the axis of said screw, said locking disk includes locking means for engagement with said annular slot, said locking means comprising arms located in the plane of said annular slots in said rim screws with the number of said arms corresponding to the number of said screws, each arm having a semi-circular engagement recess therein with a diameter approximately equal to the diameter of said annular slot and said locking disk arranged to be rotatable for displacing said engagement recesses into said annular slots on said screws, and said annular slots having a shoulder therein in engagement with said arms when said recesses are inserted into said annular slots.

22. Anti-skidding device for tires, as set forth in claim 21, wherein said cover disk having a number of openings therein corresponding to said rim screws and each said opening comprising a circular portion having a larger diameter than that of said screws and an elongated portion extending from said circular portion and said elongated portion having a width corresponding approximately to the diameter of said screws in the region of said annular slots.

23. Anti-skidding device for tires, as set forth in claim 22, wherein each said opening in said cover disk for said rim screws comprises an elongated hole having a diameter larger than that of said screws and the elongated direction of said holes extending radially in said cover disk.

24. Anti-skidding device for tires, as set forth in claim 23, including another disk covering said locking disk.

25. Anti-skidding device for tires, as set forth in claim 24, wherein said another disk covering said locking disk includes a plurality of inspection window-like openings arranged to align with said rim screws.

26. Anti-skidding device for tires, as set forth in claim 25, wherein said cover disk is an annular disk supported on said base disk, said base disk having openings therein aligned with said rim screws, and said locking device is secured on said base disk and another disk forming a cover over said locking disk.

27. Anti-skidding device for tires, as set forth in claim 26, wherein each said anti-skidding arm at the second end thereof has a protuberance arranged to extend toward the tire tread and said protuberance extending from the second end of said anti-skidding arm and has a plastic spike projecting outwardly from the surface of said anti-skidding arm arranged to face outwardly from the tire tread, and said anti-skidding arm having an opening therein adjacent said protuberance for receiving a metallic spike.

28. Anti-skidding device for tires, as set forth in claim 27, wherein each said anti-skidding arm has a bent area located in the region thereof arranged to be positioned opposite the junction of the sidewall and the tread of the tire, said bent area having a material accumulation for increasing the weight of said anti-skidding arm for counter-acting centrifugal force.

29. Anti-skidding device for tires, as set forth in claim 28, wherein each said anti-skidding arm is formed of a resilient-elastic plastic material and a rib formed in the surface of said anti-skidding arm on the side thereof arranged to face toward the sidewall of the tire with the rib extending from adjacent the first end of said arm to said bent area of said arm.

30. Anti-skidding device for tires, as set forth in claim 29, wherein said cover disk is rotatably held on said base disk.

31. Anti-skidding device for tires, as set forth in claim 30, wherein each said rim screw comprises an axially extending bolt body with a terminal thread at one end thereof, the opposite end of said bolt body forming said annular slot, defined by a head located at the opposite end of said bolt body from said terminal thread and a shoulder on said rim screw formed on the end of said bolt body adjacent said annular slot.

32. Anti-skidding device for tires, as set forth in claim 31, wherein said rim screw having an internal thread in the end of said bolt body spaced from said head portion.

* * * * *